United States Patent [19]
Tsukakoshi

[11] Patent Number: 4,783,786
[45] Date of Patent: Nov. 8, 1988

[54] CMI SIGNAL TRANSMISSION SYSTEM
[75] Inventor: Takashi Tsukakoshi, Tokyo, Japan
[73] Assignee: NEC Corporation, Tokyo, Japan
[21] Appl. No.: 884,525
[22] Filed: Jul. 11, 1986
[30] Foreign Application Priority Data
  Jul. 11, 1985 [JP] Japan ................................ 60-153465
  Aug. 27, 1985 [JP] Japan ................................ 60-186539
[51] Int. Cl.⁴ .......................................... G06F 11/00
[52] U.S. Cl. ....................................... 371/55; 371/31
[58] Field of Search ................... 371/71, 70, 55, 22,
       371/56, 31, 57; 375/57, 58, 19; 370/85, 86, 89

[56] References Cited
U.S. PATENT DOCUMENTS
4,006,455  2/1977  Hamilton ............................. 371/55
4,276,649  6/1981  Groenendaal ........................ 371/56
4,528,667  7/1985  Fruhauf ................................ 371/55
4,642,807  2/1987  Comroe ................................ 371/55
4,644,546  2/1987  Doi ....................................... 371/55
4,658,399  4/1987  D'Angio ............................... 371/55
4,677,627  6/1987  Hong ................................... 371/57

Primary Examiner—Michael R. Fleming
Attorney, Agent, or Firm—Foley & Lardner, Schwartz, Jeffery, Schwaab, Mack, Blumenthal & Evans

[57] ABSTRACT

A digital transmission system is disclosed in which a transmission signal is converted according to a CMI (coded mark inversion) coding rule. A sub-information signal is superposed on a main signal in accordance with violation of the CMI coding rule. Error pulses are added in a manner that prevents overlap with the sub-information superposing signal, thereby preventing the loss of error information.

3 Claims, 8 Drawing Sheets

F0~F3 FRAME SIGNAL
D0~D3 SUB-INFORMATION SIGNAL

CMI SIGNAL TRANSMISSION SYSTEM

BACKGROUND OF THE INVENTION

The present invention relates to a digital transmission system in which a transmission signal is converted according to a CMI (coded mark inversion) coding rule. Particularly, the invention concerns superposing a sub-information signal on a main signal according to violations of a CMI (coded mark inversion) coding rule.

Generally, in the event when binary signals indicative of information are sent out to a transmission path, it is necessary that the signals be converted into transmission path codes which fit a particular transmission medium and system used. An example of such transmission path codes is a CMI code. A CMI code is such that two bits are allocated to one bit of an input signal, i.e., a bit pattern "01" when the input signal is a "0" and a bit pattern "00" or "11" when the input signal is a "1"; the patterns "00" and "11" being transmitted alternately.

Where an alarm signal or like sub-information signal is to be superposed onto a main signal by use of the CMI code, coding is performed in such a manner as to cause a violation of the CMI coding rule to occur in a particular time slot where the superposition is desired. Specifically, to superpose a sub-information signal on a main signal in a position where the input signal is a "0", an output signal "10" is produced while, to superpose the former on the latter in a position where the input signal is a "1", no alternation of the patterns "00" and "11" occurs in that position i.e., the bit pattern corresponding to the immediately preceding input signal "1" is produced. At a receiving station, conversion is effected to turn "01" and "10" of the CMI code to "0" and "00" and "11" to "1", so a main signal may be regenerated with no regard to presence/absence of sub-information signals.

Usually, a sub-information bit is superposed on a main signal once per n bits of the main signal, and some different kinds of sub-information signals are multiplexed to constitute a frame of sub-information signal. For example, where four kinds of sub-information signals D0, D1, D2 and D3 are multiplexed with four frame bits (F0, F1, F2 and F3) distributed in the frame, F0, D0, D1, D2, D3, F1, D0, D1, D2, D3, F2, D0, D2, D3, F3, D0, Dl, D2 and D3 are superposed sequentially on every n bits of a main signal. In a subsequent point in the system such as a repeater, in response to detection of a violation of the CMI coding rule, the sub-information signals are separated from the main signal and, then, superposes the separated sub-information signals on the main signal together with sub-information signals which the repeater itself generates, the resultant composite signals being sent out to a transmission path. Meanwhile, a receiving station separates the main signal and the sub-information signals from the incoming signals from the repeater, and detects transmission errors based on the violation. If the number of errors is substantial, the receiving station may switch the transmission path currently in use to a standby transmission path. The problem heretofore pointed out with such a system is that errors are often masked to limit the accuracy of error detection because of a potential coincidence of the error and the sub-information bits or frame bits generated in the repeater.

SUMMARY OF THE INVENTION

It is therefore an object of the present invention to provide a transmission system of the type using a CMI code which is capable of improving error detection accuracy.

It is another object of the present invention to provide a system for allowing sub-information signals which are generated in a subsequent point in the system to be superposed in such a manner as to prevent signaling errors in transmission signals from being masked by sub-information signals and others.

The present invention provides a CMI signal communication system for transmitting a transmission signal produced by superposing by a violation of a CMI coding rule and on a main signal which is coded persuant to the CMI coding rule, a first sub-information signal which consists of a plurality of different kinds of sub-information arranged in a frame. The system comprises a circuit for separating the main signal which is persuant to the CMI coding rule and a violation signal which violates the rule, a circuit for generating an error pulse by detecting out of the violation signal a time slot of an error bit which appears in the transmission signal, a circuit for detecting a time slot of the first sub-information signal out of the violation signal, a circuit for generating a second sub-information signal by inserting an own repeater's sub-information signal in the time slot of the first sub-information signal, an error pulse position varying circuit for comparing the time slot of the error bit and the time slot of the second subinformation signal and, if the two time slots are not coincident, generating the error pulse and, if the two time slots are coincident, generating an error pulse which is delayed by a predetermined number of bits relative to the time slot of the second sub-information signal, a circuit for generating a violation indication signal by combining an error pulse signal outputted by the error pulse position varying circuit and the second sub-information signal, and means for superposing the violation indication signal on the main signal by a violation.

Further, the present invention provides a CMI signal communication system for transmitting a first and a second transmission signals each being produced by superposing by a violation of a CMI coding rule and on a main signal which is persuant to the CMI coding rule a first subinformation signal which consists of a plurality of different kinds of sub-information arranged in a frame over a first and a second transmission paths, respectively. The system comprises a first terminal station means for generating the first transmission signal, means for delivering the first transmission signal to the first transmission path, means for receiving the second transmission signal over the second transmission path, means for separating the main signal and a violation signal which violates the CMI coding rule from the second transmission signal, and means for commanding a loopback. The second terminal station comprises means for receiving the first transmission signal over the first transmission path, means for separating the main signal and a violation signal which violates the CMI rule from the first transmission signal, means for separating the sub-information signal from the violation signal and generating a violation indication signal which includes an own station's sub-information signal, CMI coding means for producing the second transmission signal by superposing the violation indication signal on the own station's main signal, means for delivering the second transmission signal to the second transmission path, and means for checking for the loop-back command and, when the loop-back command is present, applying the main signal which has been separated by the separating means to the CMI coding means in place of the own station's main signal. The violation indication signal generating means in the second station comprises means for generating an error pulse by detecting out of the violation signal a time slot of an error bit which appears in the transmission signal during the course of transmission, means for generating the second sub-information signal by inserting the sub-information signal of said second station in a predetermined time slot, error pulse position varying means for comparing the time slot of the error bit and the time slot of the second sub-information signal and, if the two time slots are not coincident, generating the error pulse and, if the two times slots are coincident, generating an error pulse which is delayed by a predetermined number of bits relative to the time slot of the second sub-information signal, and means for combining an error pulse signal outputted by said error pulse position varying means and the second sub-information signal.

BRIEF DESCRIPTION OF THE DRAWINGS

The above and other objects, features and advantages of the present invention will become more apparent from the following detailed description taken in conjunction with the accompanying drawings in which.

DETAILED DESCRIPTION OF THE PREFERRED EMBODIMENT

Figure 1:
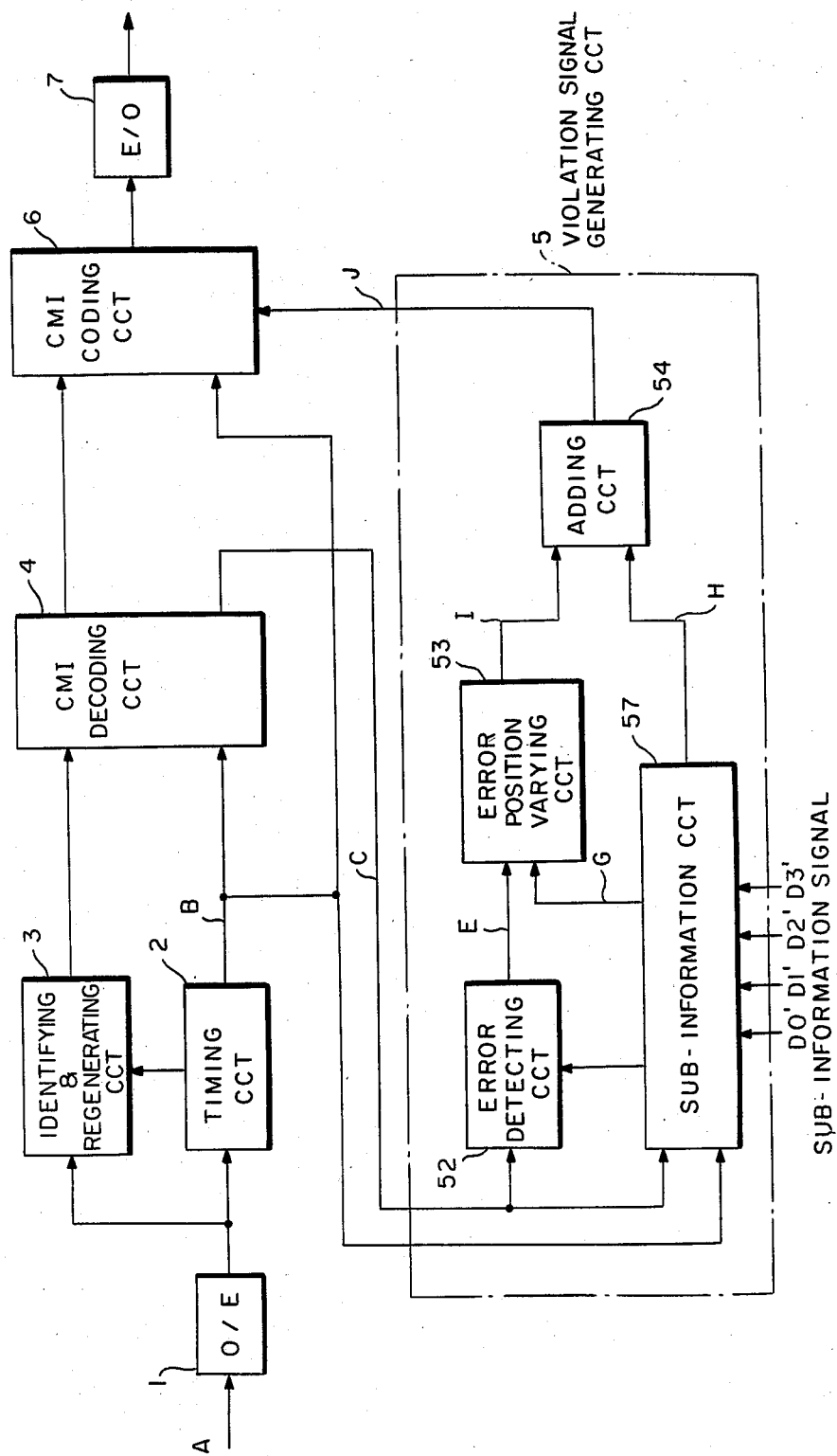
FIG. 1 is a block diagram showing a preferred embodiment of the present invention.
Figure 2:
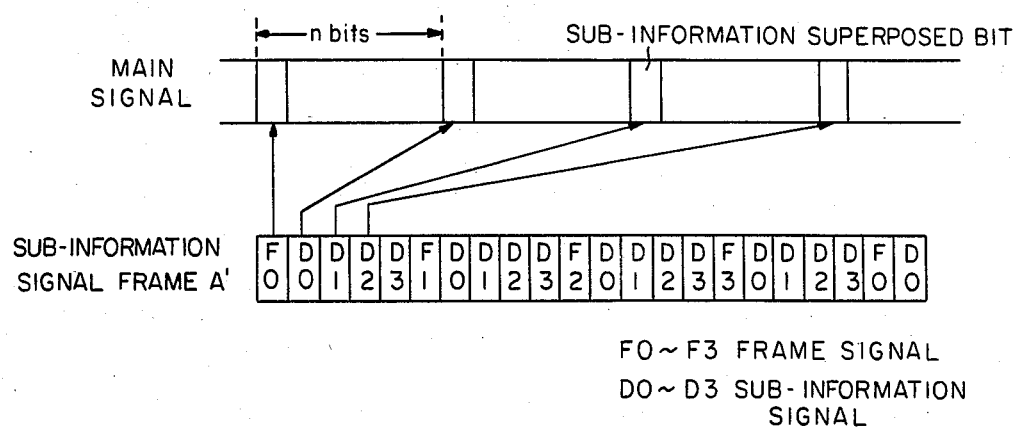
FIG. 2 shows a format representative of a transmission signal which is applied to the embodiment of the present invention.

Referring to FIGS. 1 and 2 of the drawings, an optical repeater in accordance with one embodiment of the present invention is shown. The repeater receives a transmission signal A made up of a main signal which has been coded pursuant to the CMI coding rule and sub-information signal bits which have been superposed on the main signal at the intervals of n bits of the latter on the basis of violations of the CMI coding rule. A sub-information signal frame A' has, for example, twenty bits in which frame signal bits F0, F1, F2 and F3 are inserted one in every fifth bit. Disposed between the nearby frame bits are sub-information signals D0, D1, D2 and D3. The frame bits F0, F1, F2 and F3 are respectively a "1", a "1", a "1" and a "0". The subinformation signal bits are a "1" only when information is present. Each of the sub-information signals D0, D1, D2 and D3 may represent, for example, a fault which has occurred in the repeater. A receiving station (not shown in FIG. 1) notifies a person of the occurrence of a fault at the repeater by detecting each of the subinformation bits out of the transmission signal which is sent via the repeater.

Figure 3A:
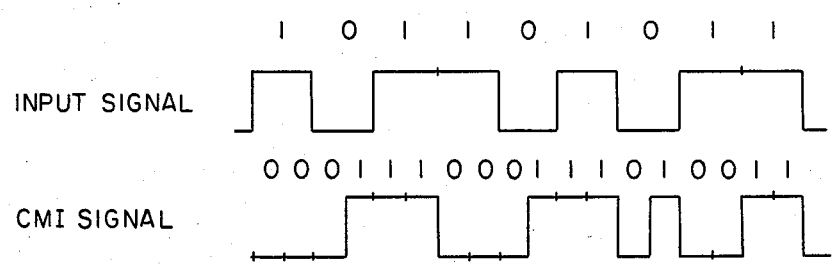
FIG. 3A. is a timing chart showing an input signal and a signal produced by CMI-coding the input signal.
Figure 3B:
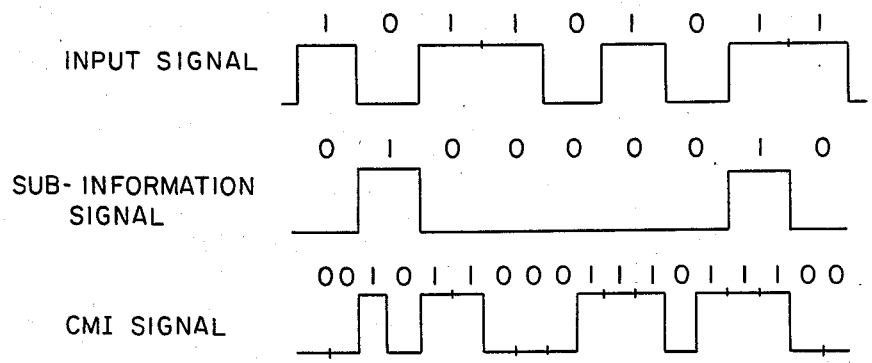
FIG. 3B is a timing chart showing an input signal, a sub-information signal and a CMI signal produced by superposing the sub-information signal on the input signal.

As shown in FIG. 3A, the CMI code is such that a pattern "01" is assigned to a "0" input signal of and a pattern "00" or "11" to a "1" input signal, "00" and "11" alternating with each other. To superpose a sub-information signal on a main signal, an intentional violation of the CMI coding rule is caused to occur in a desired bit. Specifically, as shown in FIG. 3B, to superpose a sub-information signal at a position where the input signal is a "0", the output pattern is turned to "10"; to superpose the former at a position where the latter is a "1", no alternation of "00" and "11" occurs at that position and the same pattern as that of corresponding to the preceding input signal "1" is produced.

The repeater as shown in FIG. 1 is constructed to superpose on the transmission signal A sub-information signals D0', D1', D2' and D3' associated with itself, the superposed signals being sent to the next repeater or a receiving station. The repeater comprises a opto-electric converter (O/E) 1, a timing circuit 2 for generating a timing clock B from the CMI transmission signal, an identifying and regenerating circuit 3, a CMI decoding circuit 4 for decoding a regenerated CMI transmission signal so as to produce a CMI code violation signal, or simply violation signal, C representative of sub-information and a main signal, a violation signal generating circuit 5 for superposing the new subinformation signals D0', D1', D2' and D3' on the separated signal C by a unique procedure particular to the present invention, a CMI coding circuit 6 for coding a main signal based on the CMI coding rule and superposing a violation signal J, on the main signal, and an electro-optic converter (E/O) 7. In FIG. 1, the sub-information signals D0', D1', D2' and D3' are respectively the same kind of signals as the previously mentioned sub-information signals D0, D1, D2 and D3.

Figure 6:
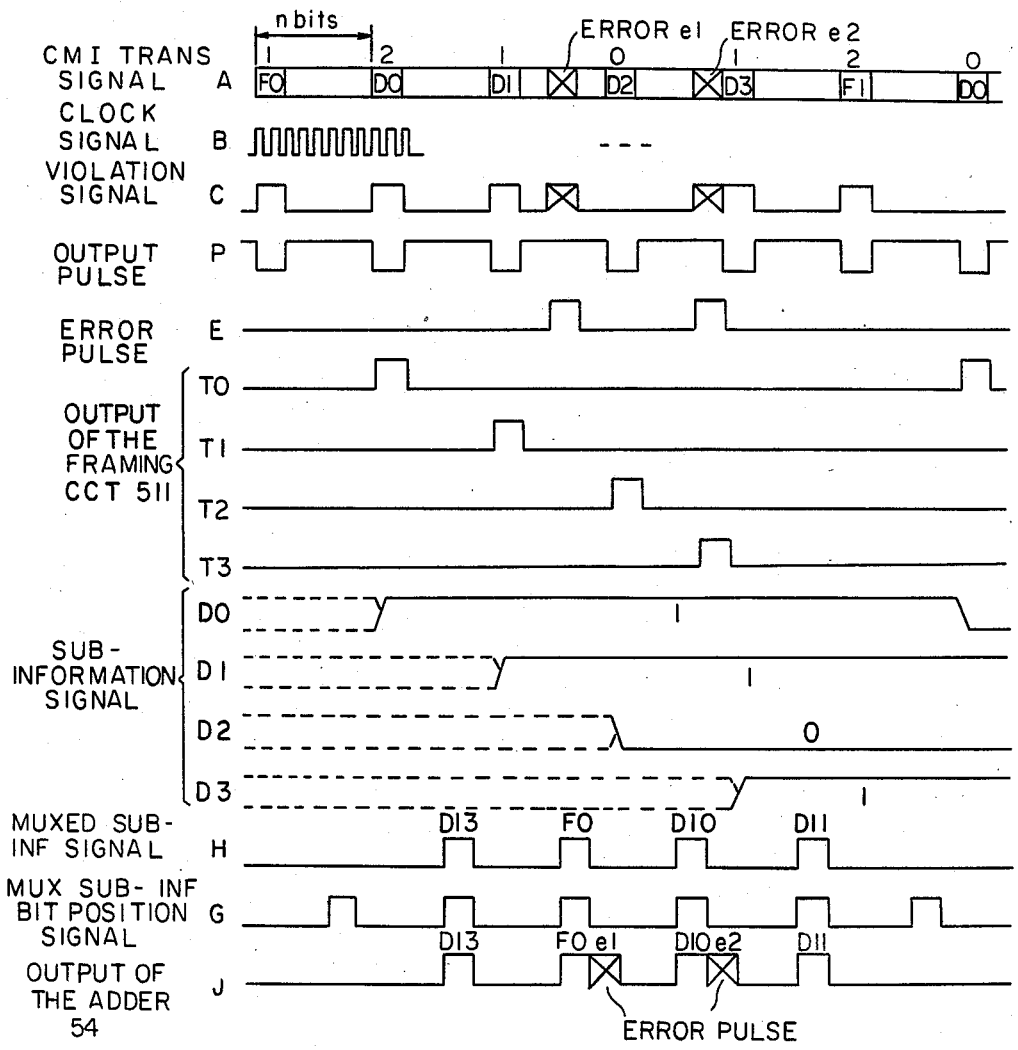
FIGS. 6 and 7 are timing charts demonstrating the operation of the embodiment of the present invention.

The operation of the repeater of FIG. 1 will be described in detail with reference to the timing charts of FIGS. 6 and 7.

Figure 4:
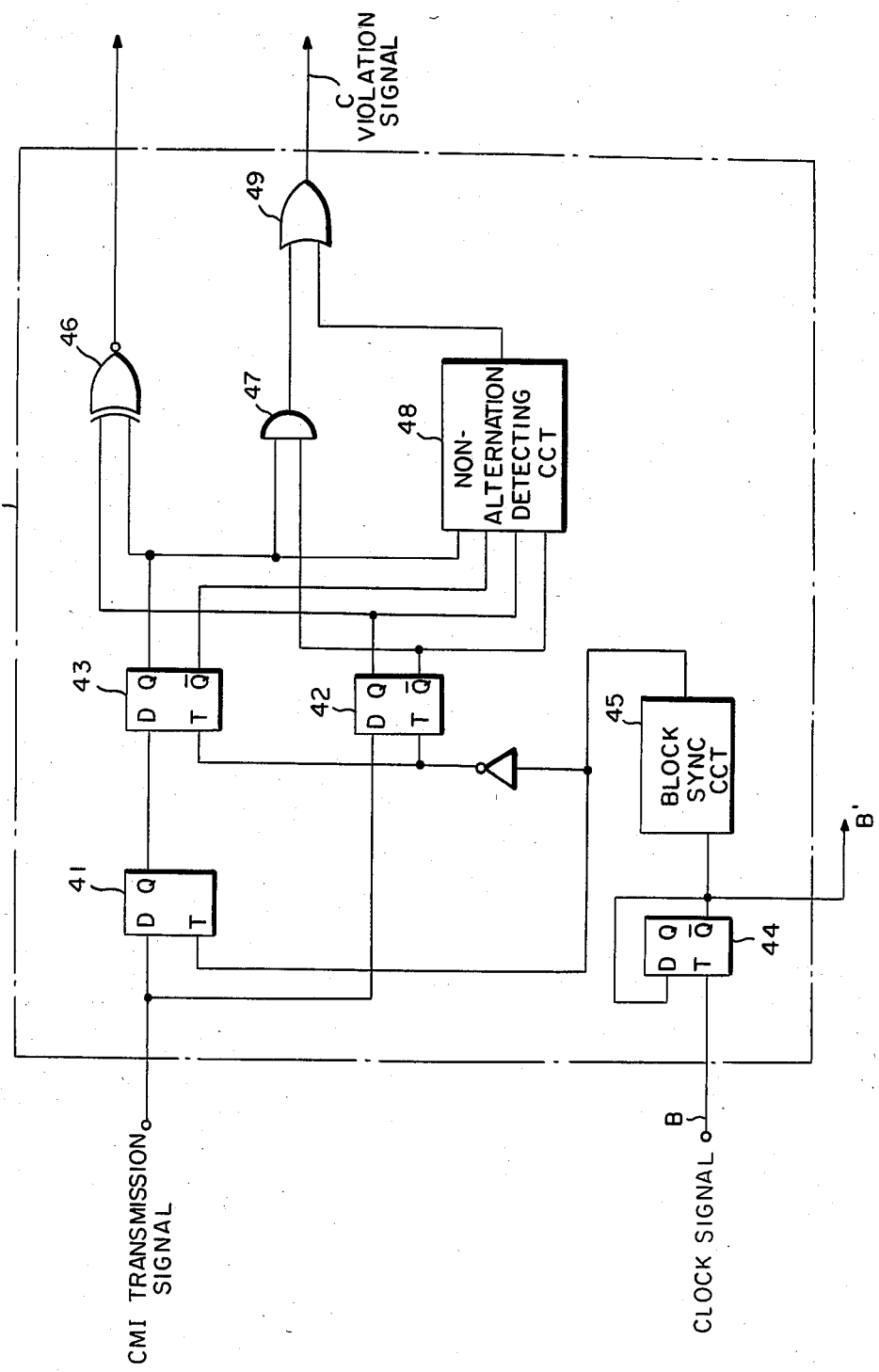
FIG. 4 is a diagram showing a specific construction of a CMI coding circuit which is included in the repeater of FIG. 1.

The timing circuit 2, responsive to the transmission signal A, generates a clock signal B having a period which is one half the block period of the transmission signal A (one block period corresponding to one bit of the main signal before coding). The identifying and regenerating circuit 3 identifies and regenerates the transmission signal A responsive to the clock B. The transmission signal regenerated and the clock signal B are applied to the CMI decoding circuit 4. As shown in FIG. 4, the circuit 4 includes a flip-flop 44 which doubles the period of the clock signal B, and a block synchronizing circuit 45 for generating a timing signal adapted to detect 2-bits code patterns ("01", "10", "00" and "11") of the respective blocks of the transmission signal. The first and the second bits of each block are respectively detected by flip-flops 41 and 42 responsive to the timing signal. A flip-flop 43 functions to delay the first bit one bit with the result that the 2-bits patterns of the respective blocks are outputted simultaneously from the flip-flops 43 and 44 block by block. An exclusive-NOR (Ex-NOR) gate 46 produces a "1" upon detection of any of the patterns "11" and "00", and a "0" upon detection of any of "10" and "01", that is, it produces the main signal. An AND gate 47 detects the pattern "10" while a non-alternation detecting circuit 48 detects non-alternations of the patterns "11" and "00". The AND gate 47 and circuit 48 are coupled to an OR gate 49 which then produces a violation signal C. This signal C comprises a decoded version of the sub-information bits D0 to D3 and frame bits F0 to F3 as contained in the transmission signal C and transmission error bits e1 and e2.

Referring again to FIG. 1, the violation signal generating circuit 5 comprises a sub-information circuit 51 for superposing the own repeater's sub-information signals D0', D1', D2' and D3' responsive to the clock signal B and violation signal C which are applied thereto, an error detecting circuit 52 for producing an error pulse E when detected a transmission error (e1, e2) out of the violation signal C, an error position varying circuit 53 capable of varying the phase of the error pulse E in order to prevent a transmission error from being erased due to superposition of sub-information signals, and an adding circuit 54 for adding an error pulse I outputted by the circuit 53 and an output (multiplexed sub-information signal) H of the circuit 51.

Figure 5:
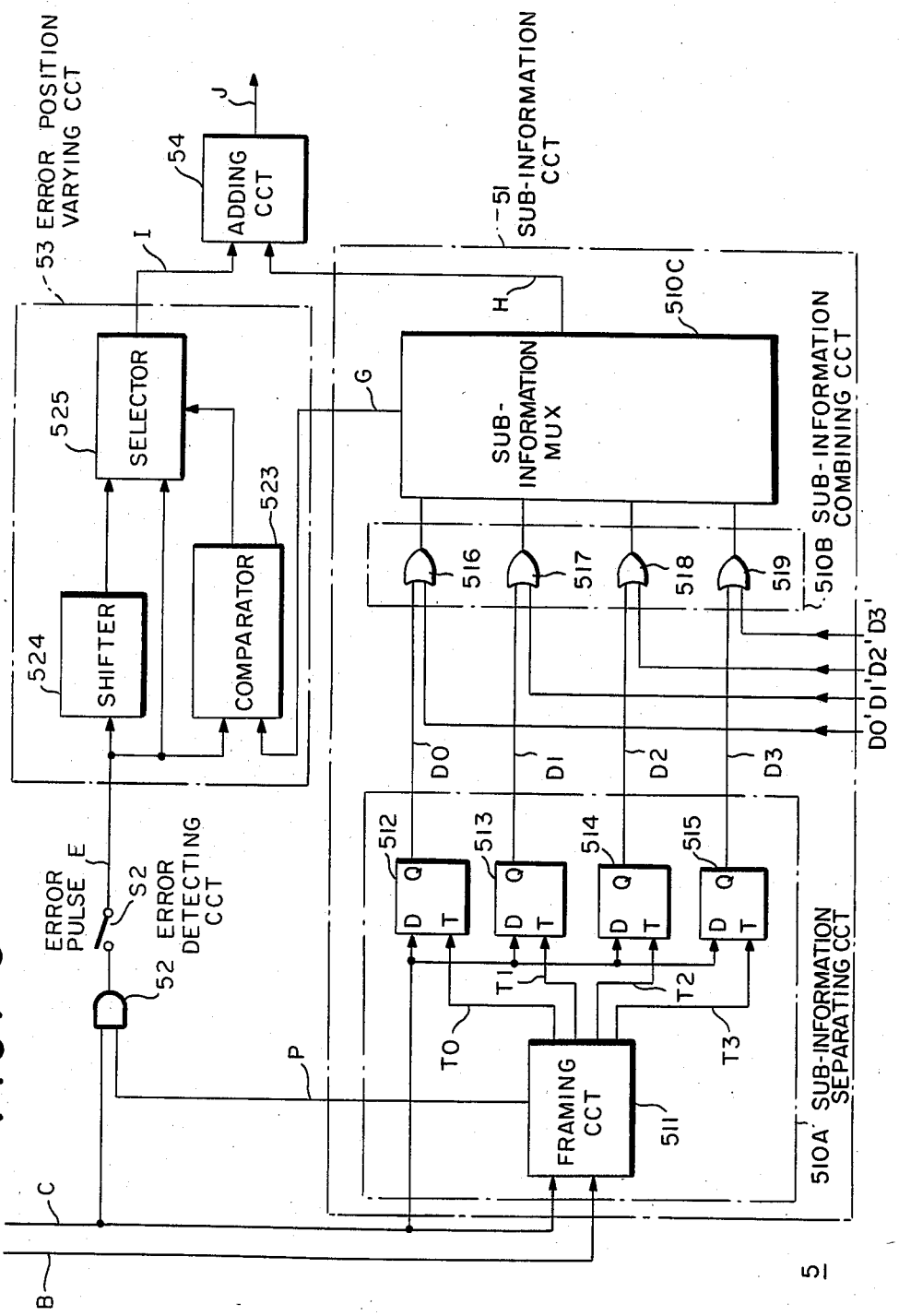
FIG. 5 is a diagram showing a specific construction of a violation signal generating circuit which is also included in the repeater of FIG. 1.

Details of the violation signal generating circuit 5 are shown in FIG. 5.

In FIG. 5, the circuit 51 includes a sub-information separating circuit 510A, a sub-information combining circuit 510B, and a sub-information multiplexing circuit 510C. The circuit 510A is made up of a framing circuit 511 and D-type flip-flops 512, 513, 514 and 515. The framing circuit 511 functions to establish frame synchronization by detecting the pattern of frame bits F0 to F3 and, thereby, distributes to T terminals of the flip-flops 512, 513, 514 and 515 output pulses T0, T1, T2 and T3 which are respectively synchronous to the positions of the sub-information bits D0, D1, D2 and D3, as shown in FIG. 6. Further, the circuit 511 generates "0" output pulses P timed to the frame and sub-information bits of the violation signal C, the pulses P being routed to the error detecting circuit (AND gate) 52 which is coupled to a switch 52 generally closed. The flip-flops 512 to 515 respectively hold the sub-information D0 to D3 until the next pulses T0 to T4 are generated, i.e., until the sub-information bits of the next frame.

Figure 7:
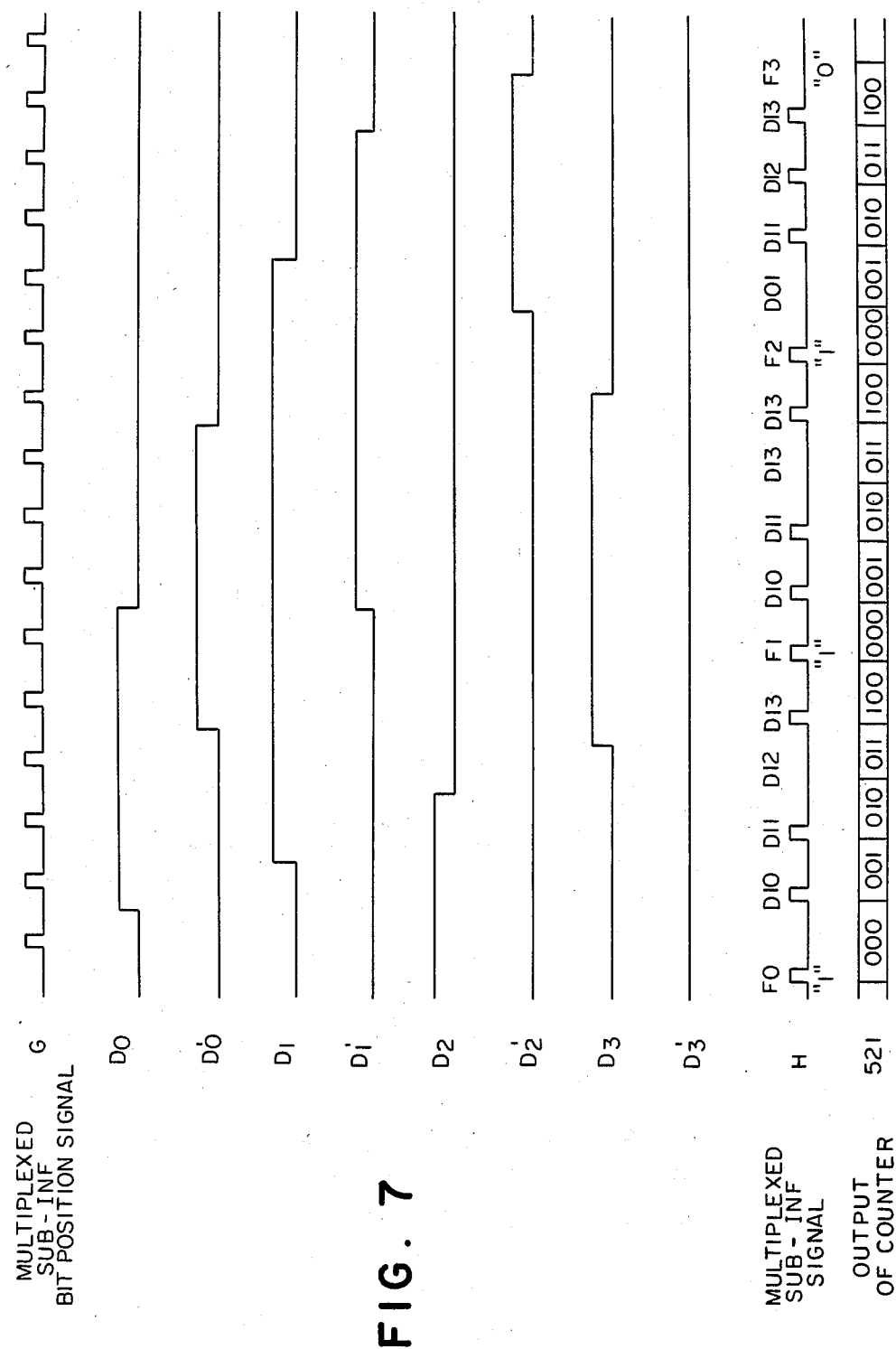

As shown in FIG. 7, the sub-information signals D0', D1', D2' and D3' which are generated within the repeater are asynchronous to their associated sub-information signals D0, D1, D2 and D3 and different in duration from the latter. OR gates 516, 517, 518 and 519 combine the sub-information signals transmitted to the repeater and those generated within the repeater. The sub-information multiplexing circuit 510 produces a multiplexed sub information signal H by multiplexing the sub-information signal bits while adding frame bits thereto.

Figure 8:
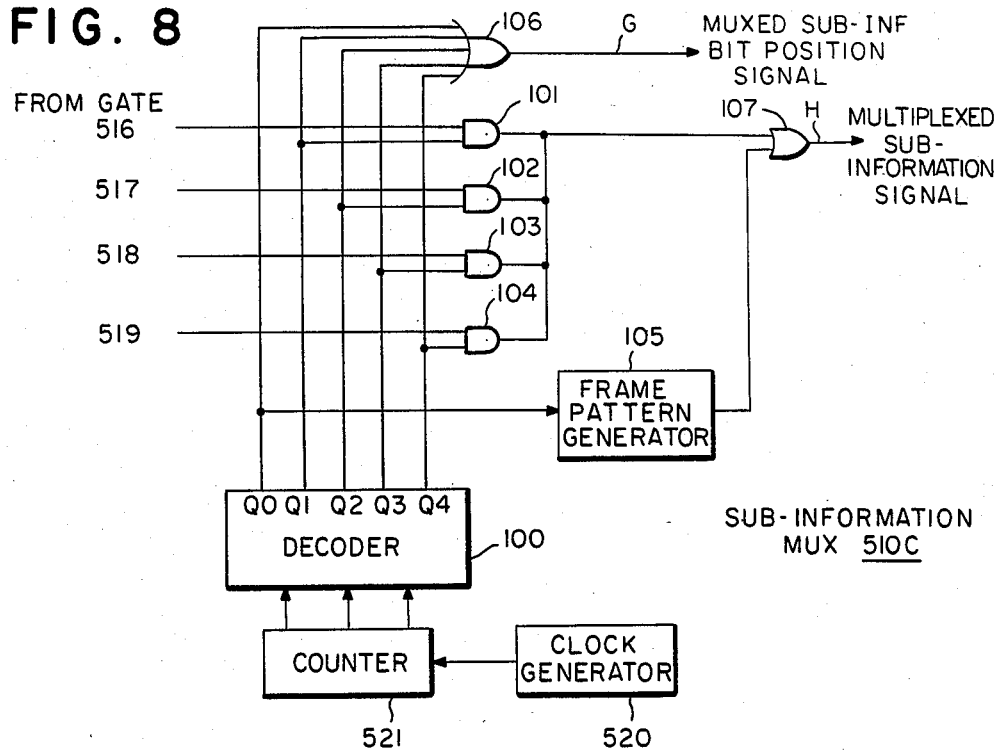
FIG. 8 is a diagram reprsentative of a subinformation multiplexing circuit which is included in the circuit of FIG. 5.

As shown in FIG. 8, the circuit 510C comprises a decoder 100, AND gates 101, 102, 103 and 104, a frame pattern generator 105, OR gates 106 and 107, a clock generator 520, and a binary counter 521 which resets the state every five counts. The decoder 100 selects output terminals Q0, Q1, Q2, Q3 and Q4 thereof every time the output of the counter 521 (FIG. 7) turns into "000", "001", "010", "011" and "100", respectively. This enables the AND gates 101 to 104 sequentially to gate outputs of the OR gates 516 to 519, respectively. Every time the decoder 100 selects the output Q0 (developed when the count is "000"), the frame pattern generator 105 generates frame patterns F0 to F3 sequentially. As a result, the multiplexed information signal H appears on the output of the OR gate 107. The OR gate 106 produces a multiplexed sub-information bit position signal G (FIG. 7) which is coupled to the adder 54. The error detector 52 detects the error pulses E indicative of transmission error from the violation signal C besides the sub-information signal and framing signal bit positions.

Turning back to FIG. 5, the error position varying circuit 53 comprises a comparator 523 adapted to compare pulse positions of the error pulses E and pulse positions of the multiplexed sub-information position signal G, a shifter 524 for shifting each error pulse E by m bits (natural number up to n - 1), and a selector 525 applied with the m-bit shifted error pulse and the non-shifted error pulse E as well as an output of the comparator 523 which serves as a control signal. When the comparator 523 has detected a coincidence of an error pulse E and the multiplexed sub-information bit position signal G, the selector 525 selects an output of the shifter 524 and, when otherwise, it selects the error pulse E to produce an output I.

Figure 9:
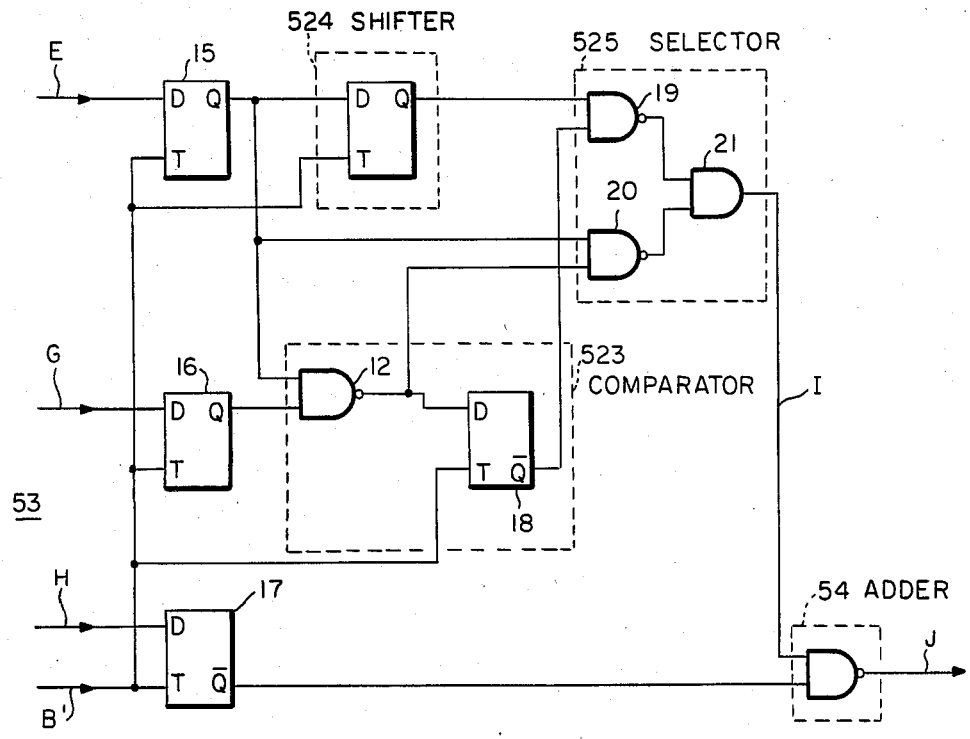
FIG. 9 is a diagram showing specific constructions of an error position varying circuit and an adding circuit as also shown in FIG. 5.

Refrring to FIG. 9, specific constructions of the error position varying circuit 52 and adding circuit 54 is shown. In this example, m is assumed to be one.

In FIG. 9, flip-flops 15, 16 and 17 at the input side of the circuit 52 are adapted to synchronize respectively the phases of error pulse E, multiplexed sub-information bit position signal G and multiplexed sub-information signal H to a clock B' (output of the flip-flop 44 (FIG. 2)) having a twice greater period than the clock B. The error pulse E is delayed by one bit by a shifter 524, which is implemented with a flip-flop, and then applied to a selector 525. A comparator 523 comprises a NAND gate 12 and a flip-flop 18 outputs of which are fed as control signals to NAND gates 20 and 19, respectively. When the error pulse E and the multiplexed sub-information bit position signal G are not coincident, the output of the gate 12 becomes a "1" to enable the NAND gate 20 and disable the NAND gate 19. As a result, the error pulse E appears as a violation signal J via the NAND gate 20 and an adder 54 (NAND gate). When the error pulse E is coincident with the signal G, on the other hand, both the gates 19 and 20 are disabled with the result that the error pulse E is not outputted by the selector 525. However, on one bit of delay after the simultaneous appearance of the pulse E and signal G, a one bit delayed error pulse is selected from the gate 19 which has then been enabled and applied to the adder 54. In this manner, even when the error pulse E has appeared simultaneously with the multiplexed sub-information signal H of FIG. 7, the circuit of FIG. 9 shifts the error pulse E to a time slot which is delayed m (=1) bit relative to the signal H before allowing it to be fed from the adder 54. This prevents the error pulse E from being dropped out from the violation signal.

In FIG. 1, the CMI coding circuit 6 encodes based on the CMI coding rule the main signal which has been decoded by the CMI decoding circuit 4 and, when supplied with a violation signal J, causes a violation so as to superpose the signal J on the main signal. The resultant composite signal is converted into an optical signal by the electro-optic converter 7 to be sent out to an optical transmission path.

Figure 10:
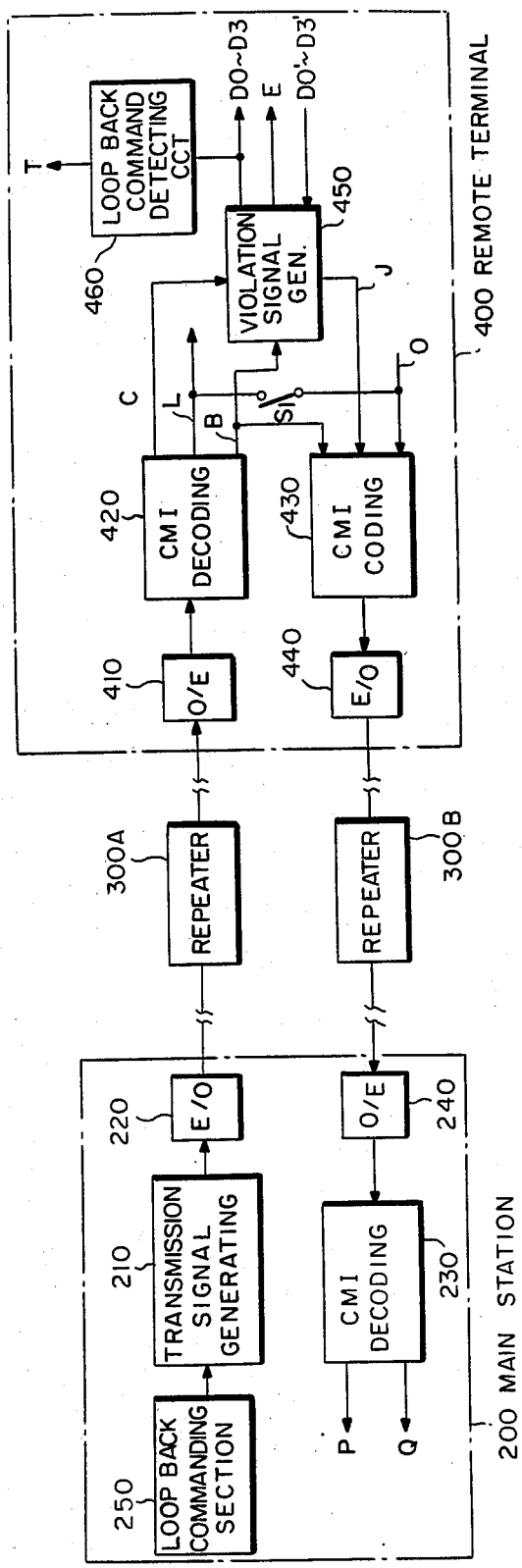
FIG. 10 is a block diagram showing a CMI signal transmission system which uses the repeater of FIG. 1.

Referring to FIG. 10, a CMI signal transmission system which uses the repeater of FIG. 1 comprises a main terminal station 200, repeaters 300A and 300B, and a remote terminal station 400.

The main terminal station 200 includes a transmission signal generating section 210, an electro-optic converter 220, and a loop-back commanding section 250. The section 210 functions to generate a transmission signal by coding a main signal according to a CMI coding rule with some violation caused by a first sub-information signal which is made up of a plurality of different kinds of sub-information which are formatted in a frame. The converter 220 serves to convert the transmission signal to an optical signal. The main terminal station 200 also receives a transmission signal sent thereto from the terminal station 400 with an opto-electric converter 240 thereof, decodes it with a CMI decoding section 230, and thereby produces a main signal P and a violation signal Q.

Usually, full-duplex communication is held between the main terminal station 200 and the remote terminal station 400. As the loop-back commanding section 250 commands a loop-back, the transmission signal generating section 210 adds loop-back command information to the sub-information signal and superposes the resultant signal on the main signal. The station 400, on detection of the loop-back command information out of the transmission signal, stops transmission of the own station's main signal and, instead, returns to the main station 200 a signal produced by superposing the own station's sub-information signal on the main signal, which is contained in the received transmission signal. In response to the transmission signal returned so, the main station 200 checks the violation signal Q for error pulses in order to see the degree of fault occurring in the transmission loop.

The repeaters 300A and 300B are each constructed in the same manner as the repeater of FIG. 1.

The station 400 includes an opto-electric converter 410 for converting a transmission signal sent from the repeater 300A to an electric signal, a CMI decoding section 420, a CMI coding section 430, an electro-optic converter 440, a violation signal generating section 450, and a loop-back command information detecting section 460. These sections except for the section 460 may be implemented with the same function blocks as those of the repeater. The CMI decoding section 420 in here is a combination of the identifying and regenerating circuit 3, timing circuit 2 and CMI decoding circuit 4 of FIG. 1.

The terminal station 400 accordingly will be described with reference to FIGS. 1 and 5 as well as FIG. 10. In FIG. 10, signals which share the same terms as those of FIGS. 1 and 5 are designated by like reference numerals for the simplicity of description.

The CMI decoding section 420 extracts the clock B from the transmission signal and separates a main signal L and a violation signal C. The sub-information separating circuit 510A (FIG. 5) in the section 450 separates the sub-information signals D0 to D3 and generates error pulses E. Only the own station's sub-information signals D0' to D3' are applied to the sub-information signal multiplexing circuit 510C (FIG. 5) and, via the adder 54, produced as a violation signal J.

Under usual operating conditions without a loop-back command, a switch $S_1$ and the switch $S_2$ (FIG. 5) are open to allow the own station's main signal O to be fed to the CMI coding section 430. The violation signal J is superposed on the own station's main signal O, the composite signal being transmitted via the converter 440. Because the switch $S_2$ is open, error pulses E associated with the path from the main station 200 to the remote station 400 are not sent out to the path from the station 400 to the station 200.

As the main station 200 sends loop-back command information as a sub-information signal, the loop-back command information detector 460 detects it out of, among the sub-information signals D0 to D3, the one (e.g. signal D0) which is assigned to the loop-back command information, thereby producing a signal T. The signal T causes the main signal O to be intercepted and the switches $S_1$ and $S_2$ (FIG. 5) to close. Consequently, the main signal L and the violation signal J which includes error pulses E and sub-information signals D0' to D4' are fed to the CMI coder 430. In this instance, the error pulses are not masked by the sub-information signals D0' to D4'.

The transmission system of FIG. 10 allows the main station 200 to detect errors in the transmission path with remarkably high accuracy since the errors are not masked by any of the repeaters 300A and 300B and the remote station 400.

In summary, it will be seen that in accordance with the present invention error pulses are added in such a manner as not to overlap sub-information superposing bits, so error information can be transmitted without being lost even if sub-information is superposed at a repeater or at a station which is remote from a main station.

What is claimed is:

1. A repeater for use in a CMI signal transmission line system over which a transmission signal is transmitted, said transmission signal being produced by encoding a main signal pursuant to a CMI coding rule with a first sub-information signal superposed by a violation of the CMI coding rule, said first sub-information signal including a plurality of different kinds of sub-information arranged in a frame, said repeater comprising:

means responsive to said transmission signal for separating from said transmission signal the main signal which is pursuant to the CMI coding rule and a violation signal which violates the CMI coding rule;

means electrically coupled to said separating means for detecting out of the violation signal an error bit which appears in the transmission signal;

means electrically coupled to said separating means for detecting the first sub-information signal out of the violation signal to produce a detected sub-information signal;

means electrically coupled to said first sub-information signal detecting means for generating a second sub-information signal by inserting sub-information related to the repeater in a time slot of the first sub-information signal;

error pulse position varying means electrically coupled to said error bit detecting means and said second sub-information signal generating means for comparing a time slot of the error bit and a time slot of the second sub-information signal and, if the two time slots are not coincident, generating an error pulse and, if the two time slots are coincident, delaying the error pulse by a predetermined number of bits relative to the time slot of the second sub-information signal;

means for generating a violation indication signal by combining the error pulse signal outputted by said error pulse position varying means and the second sub-information signal; and means electrically coupled to said separating means and said violation indication signal generating means for superposing the violation indication signal on the main signal by a violation of the CMI coding rule.

2. A CMI signal transmission system for transmitting first and second transmission signals, each being produced by superposing first and second violation signals which represent a violation of a CMI coding rule, on first and second main signals, which are pursuant to the CMI coding rule, and first and second sub-information signals, which consist of a plurality of different kinds of sub-information arranged in a frame, over a first and a second transmission paths, respectively, said system comprising:

a first terminal station having first transmission signal generating means for generating the first transmission signal, means electrically coupled to said first transmission signal generating means for delivering the first transmission signal to the first transmission path, second transmission signal receiving means for receiving the second transmission signal over the second transmission path, first separating means electrically coupled to said second transmission signal generating means for separating the second main signal and the second violation signal which violates the CMI coding rule from the second transmission signal, and means for commanding a loop-back so that said first transmission signal includes a loop-back command as said first sub-information signal; and a second terminal station having first transmission signal receiving means for receiving the first transmission signal over the first transmission path, second separating means electrically coupled to said first transmission signal receiving means for separating the first main signal and the first violation signal which violates the CMI rule from the first transmission signal, third separating means electrically coupled to said second separating means for separating the first sub-information signal from the first violation signal, signal generating means electrically coupled to said third separating means for generating the second violation signal which includes sub-information related to the second terminal station, CMI coding means electrically coupled to said signal generating means for producing the second transmission signal by superposing the second violation signal on the second main signal, means electrically coupled to said CMI coding means for delivering the second transmission signal to the second transmission path, and means responsive to said third separating means for checking for the loop-back command and, when the loop-back command is present, applying the first main signal which has been separated by said second separating means to said CMI coding means in place of the second main signal;

said signal generating means having means responsive to said first violation signal for generating an error pulse by detecting out of the first violation signal a time slot of an error bit which appears in the first transmission signal during the course of transmission, means for generating the second sub-information signal by inserting the sub-information related to said second terminal station in a predetermined time slot, error pulse position varying means electrically coupled to said error pulse generating means and second sub-information generating means for comparing the time slot of the error bit and the time slot of the second sub-information signal and, if the two time slots are not coincident, generating the error pulse and, if the two time slots are coincident, generating an error pulse which is delayed by a predetermined number of bits relative to the time slot of the second sub-information signal, and means for combining an error pulse signal outputted by said error pulse position varying means and the second sub-information signal.

3. A method of operating a repeater for use in a CMI signal transmission line system over which a transmission signal is transmitted, said transmission signal being produced by encoding a main signal pursuant to a CMI coding rule with a first sub-information signal superposed by a violation of the CMI coding rule, said first sub-information signal including a plurality of different kinds of sub-information arranged in a frame, said method comprising the steps of:

separating from said transmission signal the main signal which is pursuant to the CMI coding rule and a violation signal which violates the CMI coding rule for determining a violation of the CMI coding rule;

generating an error pulse by detecting out of the violation signal a time slot of an error bit which appears in the transmission signal;

detecting a time slot of the first sub-information signal out of the violation signal;

generating a second sub-information signal by inserting sub-information related to the repeater in the time slot of the first sub-information signal;

comparing the time slot of the error bit and the time slot of the second sub-information signal and, if the two time slots are not coincident, generating an error pulse and, if the two time slots are coincident, delaying the error pulse by a predetermined number of bits relative to the time slot of the second sub-information signal;

generating a violation indication signal by combining the error pulse signal and the second sub-information signal; and superposing the violation indication signal on the main signal by a violation of the CMI coding rule.

* * * * *